(12) United States Patent
Shin et al.

(10) Patent No.: US 9,037,379 B2
(45) Date of Patent: May 19, 2015

(54) APPARATUS AND METHOD FOR PROVIDING A CRASH PREVENTION CONTROL FUNCTIONALITY FOR A VEHICLE

(71) Applicant: Hyundai Motor Company, Seoul (KR)

(72) Inventors: Min Yong Shin, Seoul (KR); Si Hyoung Lee, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 13/903,928

(22) Filed: May 28, 2013

(65) Prior Publication Data

US 2014/0188366 A1 Jul. 3, 2014

(30) Foreign Application Priority Data

Dec. 27, 2012 (KR) ........................ 10-2012-0155003

(51) Int. Cl.
*G08G 1/16* (2006.01)

(52) U.S. Cl.
CPC ................ *G08G 1/166* (2013.01); *G08G 1/167* (2013.01)

(58) Field of Classification Search
None
See application file for complete search history.

(56) References Cited

U.S. PATENT DOCUMENTS

| | | | |
|---|---|---|---|
| 7,124,027 B1 * | 10/2006 | Ernst et al. ..................... 701/301 |
| 7,158,015 B2 * | 1/2007 | Rao et al. ....................... 340/436 |
| 8,090,537 B2 * | 1/2012 | Nishira et al. ................. 701/301 |
| 8,437,890 B2 * | 5/2013 | Anderson et al. ................. 701/3 |
| 8,457,827 B1 * | 6/2013 | Ferguson et al. ............... 701/23 |
| 8,473,144 B1 * | 6/2013 | Dolgov et al. ................... 701/28 |
| 8,504,233 B1 * | 8/2013 | Ferguson et al. ............... 701/23 |
| 2004/0193374 A1 * | 9/2004 | Hac et al. ....................... 701/301 |
| 2006/0085131 A1 * | 4/2006 | Yopp et al. ..................... 701/301 |
| 2007/0043491 A1 * | 2/2007 | Goerick et al. ................. 701/41 |

(Continued)

FOREIGN PATENT DOCUMENTS

| | | |
|---|---|---|
| JP | 2009-006824 A | 1/2009 |
| JP | 2011-512283 A | 4/2011 |
| KR | 10-2010-0072779 A | 7/2010 |
| KR | 10-1029096 B1 | 4/2011 |

(Continued)

OTHER PUBLICATIONS

Notice of Allowance issued in Korean Application No. 10-2012-0155003 dated Oct. 13, 2014.

(Continued)

*Primary Examiner* — John R Olszewski
*Assistant Examiner* — Jess Whittington
(74) *Attorney, Agent, or Firm* — McDermott Will & Emery LLP

(57) ABSTRACT

An apparatus for providing crash prevention control functionality to a vehicle includes: a dangerous situation determining unit determining whether a dangerous situation is developing with respect to a side approaching vehicle based on information relating to the vehicle approaching from a side direction; a lane keeping assist system (LKAS) control area calculation unit calculating a control area to apply to a LKAS so as to avoid the approaching vehicle when the approaching vehicle is causing a dangerous situation; a smart cruise control (SCC) control value calculation unit calculating a control value to apply to an SCC system so as to avoid the approaching vehicle when the approaching vehicle is causing a dangerous situation; and a drive control unit configured to output a control signal to at least one of the LKAS and the SCC system according to the calculation results.

19 Claims, 10 Drawing Sheets

(56) References Cited

U.S. PATENT DOCUMENTS

| | | | |
|---|---|---|---|
| 2009/0157247 A1* | 6/2009 | Sjogren et al. | 701/23 |
| 2009/0299573 A1* | 12/2009 | Thrun et al. | 701/41 |
| 2010/0256852 A1* | 10/2010 | Mudalige | 701/24 |
| 2011/0190972 A1* | 8/2011 | Timmons et al. | 701/29 |
| 2011/0234390 A1 | 9/2011 | Danner et al. | |
| 2012/0130561 A1* | 5/2012 | Chiang | 701/1 |
| 2012/0130629 A1* | 5/2012 | Kim | 701/301 |
| 2012/0235853 A1* | 9/2012 | Takeuchi | 342/71 |

FOREIGN PATENT DOCUMENTS

| | | |
|---|---|---|
| KR | 10-2011-0062439 A | 6/2011 |
| KR | 10-2012-0067759 A | 6/2012 |
| KR | 10-2012-0067762 A | 6/2012 |

OTHER PUBLICATIONS

Office Action issued in Korean Application No. 10-2012-0155003 dated May 27, 2014.

* cited by examiner

APPARATUS AND METHOD FOR PROVIDING A CRASH PREVENTION CONTROL FUNCTIONALITY FOR A VEHICLE

CROSS-REFERENCE TO RELATED APPLICATION

This application claims priority from Korean patent application No. 10-2012-0155003, filed on Dec. 27, 2012, the disclosure of which is hereby incorporated in its entirety by reference.

TECHNICAL FIELD

The present disclosure relates to an apparatus and a method for providing a crash prevention control functionality for a vehicle, and more particularly, to a technology for preventing a crash with a vehicle approaching from a side direction. The technology works in association with a lane keeping assist system (LKAS) and a smart cruise control (SCC) system to provide the crash prevention functionality.

BACKGROUND

A lane keeping assist system (LKAS) is a system that automatically prevents a vehicle from deviating from a lane when the vehicle drives, informs a driver of a lane departure through a vibration of a handle, a warning sound, or the like, and assists the vehicle in staying in a lane by automatically steering the handle when the vehicle deviates from the lane. Meanwhile, a smart cruise control (SCC) system is a system that automatically maintains an appropriate distance between a preceding vehicle and the driving vehicle using a sensor mounted in front of the vehicle, and maintains either a preset inter-vehicle distance when a preceding vehicle is present of a preset driving speed when a preceding vehicle is not present.

The above-mentioned LKAS and SCC systems may be simultaneously operated when a vehicle is in operation. However, the systems may be unable to avoid certain types of crashes between the vehicles.

SUMMARY

The present disclosure is made in view of the above problems, and provides an apparatus and a method for providing crash prevention control functionality to a vehicle. The crash prevention control functionality may be used to prevent a crash with another vehicle which approaches from a side direction, and may work in association with a lane keeping assist system (LKAS) and a smart cruise control (SCC) system.

The present disclosure further provides an apparatus and a method for providing a crash prevention control functionality to a vehicle by using both the LKAS and the SCC system in order to prevent a crash with a side approaching vehicle by simultaneously controlling a transversal position and controlling a longitudinal position/velocity of the vehicle while maintaining the vehicle in its current lane.

In accordance with an aspect of the present disclosure, an apparatus for providing crash prevention control functionality to a vehicle includes: a dangerous situation determining unit configured to determine whether a dangerous situation is developing with respect to a side approaching vehicle based on information relating to the side approaching vehicle approaching the vehicle from a side direction; a lane keeping assist system (LKAS) control area calculation unit configured to calculate a control area to apply to an LKAS so as to avoid the side approaching vehicle when it is determined that the side approaching vehicle is causing a dangerous situation according to the determination result; a smart cruise control (SCC) control value calculation unit configured to calculate a control value to apply to an SCC system so as to avoid the side approaching vehicle when it is determined that the side approaching vehicle is causing a dangerous situation according to the determination result; and a drive control unit configured to output a control signal to at least one of the LKAS and the SCC system according to the calculation results. The LKAS control area calculation unit and the SCC control value calculation unit respectively calculate the control area and the control value based on at least one of: a velocity of the vehicle in a longitudinal direction, a distance between the vehicle and the side approaching vehicle, and a relative velocity of the vehicles. The LKAS control area calculation unit expands the control area for the vehicle in a range that does not extend beyond boundaries of a current lane of the vehicle. The LKAS control area calculation unit expands the control area in a direction in which the approaching vehicle approaches the vehicle, and maintains the control area in a direction in which the approaching vehicle does not approach the vehicle. The SCC control value calculation unit increases or decreases a SCC set speed for the vehicle according to the relative location of the approaching vehicle. The SCC control value calculation unit decreases the SCC set speed when the approaching vehicle approaches in a sideways direction from a front of the vehicle, and increases the SCC set speed when the dangerous vehicle approaches in a sideways direction from a rear of the vehicle. The SCC control value calculation unit increases or decreases a distance between the vehicle and a preceding vehicle according to the relative location of the approaching vehicle. The SCC control value calculation unit increases the distance between the vehicle and the preceding vehicle when the approaching vehicle approaches in a sideways direction from the front and decreases the distance between the vehicle and the preceding vehicle when the approaching vehicle approaches in a sideways direction from the rear. The drive control unit outputs the control signal based on the control area calculated for the LKAS in situations in which a degree of danger presented by the approaching vehicle is equal to or less than a reference value. The drive control unit outputs the control signal based on the control area calculated for the LKAS and the control value calculated for the SCC system when a degree of danger presented by the approaching vehicle exceeds a reference value.

In accordance with another aspect of the present disclosure, a method for providing crash prevention control functionality to a vehicle includes: determining whether a dangerous situation is developing with respect to a side approaching vehicle based on information relating to the side approaching vehicle approaching the vehicle from a side direction; calculating a control area to apply to a lane keeping assist system (LKAS) and a control value to apply to a smart cruise control (SCC) system so as to avoid the side approaching vehicle when it is determined that the side approaching vehicle is causing a dangerous situation according to the determination result; and outputting a control signal to at least one of the LKAS and the SCC system according to the calculated result. Calculating the control area and the control value comprises calculating the control area and the control value based on at least one of a velocity of the vehicle in a longitudinal direction, a distance between the vehicle and the side approaching vehicle, and a relative velocity of the vehicles. Calculating the control area comprises expanding the control area of the LKAS in a range that does not extend beyond boundaries of a current lane of the vehicle. Calculating the control area comprises expanding the control area in a direction in which the approaching vehicle approaches the vehicle and maintaining the control area in a direction in which the approaching vehicle does not approach the vehicle. Calculating the control area comprises increasing or decreasing the SCC set speed for the vehicle according to the relative location of the approaching vehicle. Calculating the control area comprises increasing or decreasing a distance between a preceding vehicle and the vehicle according to the relative location of the approaching vehicle. Outputting the control signal comprises outputting the control signal based on the control area calculated for the LKAS when a degree of danger presented by the approaching vehicle is equal to or less than a reference value, and outputting the control signal based on the control area calculated for the LKAS and the control value calculated for the SCC system when a degree of danger presented by the approaching vehicle exceeds the reference value.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Exemplary embodiments of the present disclosure are described with reference to the accompanying drawings. The same reference numbers are used throughout the drawings to refer to the same or like parts. Detailed descriptions of well-known functions and structures incorporated herein may be omitted to avoid obscuring the subject matter of the present disclosure.

Hereinafter, exemplary embodiments are described in detail with reference to the accompanying drawings.

Figure 1:
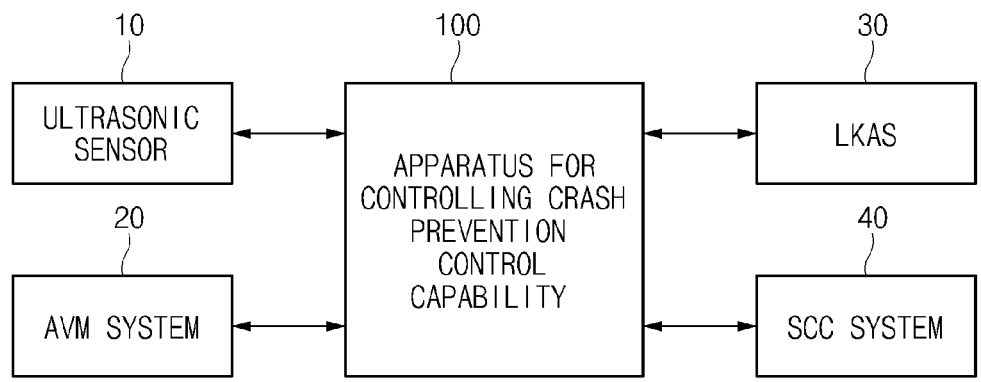
FIG. 1 is a diagram illustrating a system configuration of an apparatus for providing a crash prevention control functionality to a vehicle according to an exemplary embodiment of the present disclosure.

FIG. 1 is a diagram illustrating a system configuration of an apparatus for providing a crash prevention control functionality to a vehicle according to the exemplary embodiment of the present disclosure.

Referring to FIG. 1, an apparatus for providing crash prevention control functionality to a vehicle (hereinafter, referred to 'a control apparatus') 100 according to the exemplary embodiment of the present disclosure senses an approaching vehicle which approaches a driving vehicle using an ultrasonic sensor 10 and an around view monitor (AVM) system 20. The ultrasonic sensor 10 produces a sensor measuring value, and the AVM system 20 produces an AVM image. Particularly, the control apparatus 100 senses a side approaching vehicle which approaches the driving vehicle from a side direction.

When the side approaching vehicle is sensed, the control apparatus 100 controls the vehicle so as to avoid the side approaching vehicle based on information on the side approaching vehicle.

The control apparatus 100 is associated with a lane keeping assist system (hereinafter referred to as a 'LKAS') 30 and a smart cruise control (hereinafter referred to as a 'SCC') system 40. It may be preferable that the control apparatus 100 operates in a state in which both of the LKAS 30 and the SCC 40 are operational and capable of controlling the driving of the vehicle.

When the side approaching vehicle is sensed based on a sensor measuring value of the ultrasonic sensor 10 and an AVM image of the AVM system 20, the control apparatus 100 controls the driving of the vehicle so as to avoid the side approaching vehicle through the LKAS 30 and the SCC system 40.

In particular, the control apparatus 100 controls the driving of the vehicle so as to avoid the side approaching vehicle when the vehicle is operated in a state in which the vehicle stays in a current lane using the LKAS 30.

A detailed description of configurations related to the control apparatus 100 according to the exemplary embodiment of the present disclosure will be described in detail with reference to FIG. 2.

Figure 2:
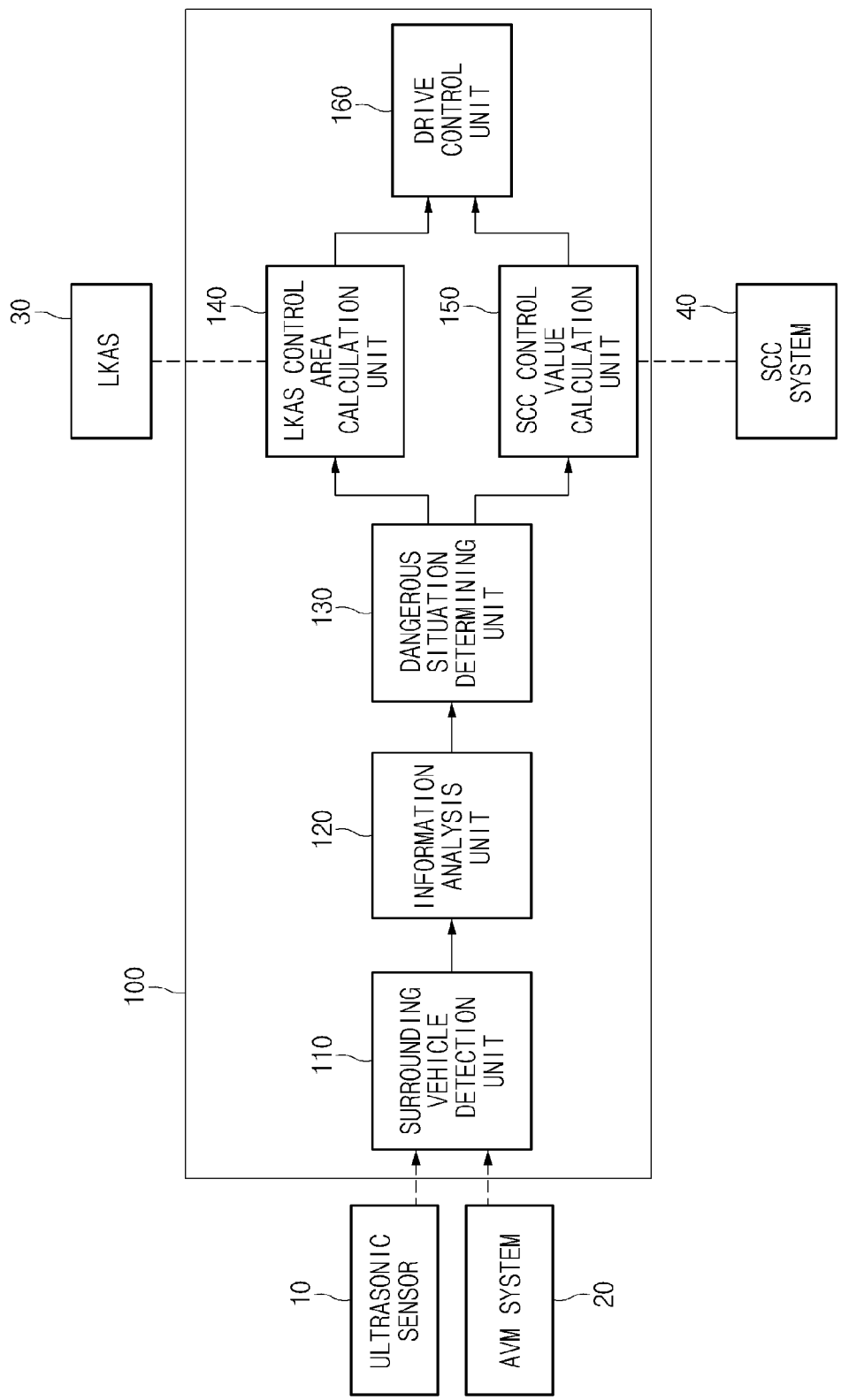
FIG. 2 is a block diagram illustrating a configuration of an apparatus for providing a crash prevention control functionality to a vehicle according to the exemplary embodiment of the present disclosure.

FIG. 2 is a block diagram illustrating a configuration of an apparatus for providing crash prevention control functionality to a vehicle according to the exemplary embodiment of the present disclosure.

Referring to FIG. 2, the control apparatus 100 includes a surrounding vehicle detection unit 110, an information analysis unit 120, a dangerous situation determining unit 130, an LKAS control area calculation unit 140, a SCC control value calculation unit 150, and a drive control unit 160.

The surrounding vehicle detection unit 110 is communicatively connected to the ultrasonic sensor 10 and to the AVM system 20 shown in FIG. 1, and receives a sensor measurement value from the ultrasonic sensor 10 and an AVM image from the AVM system 20. The surrounding vehicle detection unit 110 detects any surrounding vehicle positioned in a predetermined area surrounding the vehicle based on the received sensor measurement value and the received AVM image. The surrounding vehicle detection unit 110 transmits the sensor measurement value and the AVM image to the information analysis unit 120 when a vehicle is detected in the predetermined area surrounding the vehicle. Particularly, the surrounding vehicle detection unit 110 transmits the sensor measurement value and the AVM image to the information analysis unit 120 when the detected vehicle is located on either side of the vehicle. The information analysis unit 120 analyzes the sensor measurement value and the AVM image input from the surrounding vehicle detection unit 110. The information analysis unit 120 may determine and analyze a relative velocity of the vehicles in a longitudinal direction (wherein the longitudinal direction is the direction of travel of the vehicle), a distance between the vehicles in a transverse direction (wherein the transverse direction is a direction transverse to the direction of travel of the vehicle), and a relative velocity of the vehicles in a transverse direction as detected by the surrounding vehicle detection unit 110. The information analysis unit 120 transmits the information analysis result relating to the detected vehicle to the dangerous situation determining unit 130.

The dangerous situation determining unit 130 verifies the information analysis result relating to the detected vehicle and received from the information analysis unit 120, and compares the information relating to the detected vehicle with information relating to the driving vehicle to determine whether a dangerous situation is developing with respect to the detected vehicle. In this case, when it is determined that the detected vehicle is approaching the driving vehicle and/or is otherwise determined to be a dangerous vehicle, the dangerous situation determining unit 130 transmits the determination result to the LKAS control area calculation unit 140 and to the SCC control value calculation unit 150.

Here, the dangerous situation determining unit 130 determines a degree of danger posed by the detected/dangerous/ side-approaching vehicle and transmits the determined result to only one of the LKAS control area calculation unit 140 or the SCC control value calculation unit 150 according to the determined degree of danger.

The LKAS control area calculation unit 140 is associated with the LKAS 30. When it is determined that the detected vehicle is a dangerous vehicle (e.g., a side-approaching vehicle), the LKAS control area calculation unit 140 calculates a control area to apply to the LKAS 30 based on the control information of the LKAS 30. In this case, the LKAS control area calculation unit 140 may calculate the control area to apply to the LKAS 30 based at least in part on one of a longitudinal velocity of the driving vehicle, the distance to the dangerous vehicle in a transverse direction, and the relative velocity of the vehicle in the transverse direction. The control area to apply to the LKAS 30 may be an area within which the driving vehicle should be located, and into which the LKAS 30 may control or drive the vehicle. In one example, the control area may be an area that is spaced away from the dangerous/side-approaching vehicle in a transverse/ lateral direction (e.g., so as to position the driving vehicle laterally away from the dangerous vehicle).

Particularly, the LKAS control area calculation unit 140 can expand the control area for the driving vehicle in a transverse/lateral direction within a range that does not deviate from or extend beyond the boundaries of the current lane. In this case, the LKAS control area calculation unit 140 expands the control area in the direction in which the dangerous vehicle approaches on the side of the driving vehicle on which the dangerous vehicle approaches (e.g., so as to enable the driving vehicle to move away from the dangerous vehicle by moving in the same direction as the direction in which the dangerous vehicle approaches), and maintains the existing setting value in the control area in the direction in which the dangerous vehicle does not approach on the side of the driving vehicle on which the dangerous vehicle does not approach (e.g., in a direction opposite to the direction in which the dangerous vehicle approaches, such as a direction that is towards the dangerous vehicle).

The LKAS control area calculation unit 140 outputs the control area calculation result for the LKAS 30 to the drive control unit 160.

The SCC control value calculation unit 150 is associated with the SCC system 40. When it is determined that the detected vehicle is a dangerous vehicle (e.g., a side-approaching vehicle), the SCC control value calculation unit 150 calculates a control value to apply to the SCC system 40 based on the control information of the SCC system 40. In this case, the SCC control value calculation unit 150 may calculate the control value to apply to the SCC system 40 based at least in part on one of a longitudinal velocity of the driving vehicle, the distance to the dangerous vehicle in the transverse direction, and the relative velocity of the vehicles in the transverse direction. The control area to apply to the SCC system 40 may be an area within which the driving vehicle should be located, and into which the SCC system 40 may control or drive the vehicle. In one example, the control area may be an area that is spaced away from the dangerous/side-approaching vehicle in a longitudinal direction (e.g., so as to position the driving vehicle in front of or behind the dangerous vehicle).

Here, the SCC control value calculation unit 150 may increase or decrease the SCC set speed for the driving vehicle according to the relative location of the approaching/dangerous vehicle, and/or may increase or decrease a distance between the preceding vehicle and the driving vehicle.

When calculating the SCC set speed for the driving vehicle according to the relative location of the approaching dangerous vehicle, the SCC control value calculation unit 150 decreases the SCC set speed if the dangerous vehicle is located ahead of the driving vehicle and/or approaches the driving vehicle in a sideways direction from the front of the driving vehicle. The SCC control value calculation unit 150 increases the SCC set speed if the dangerous vehicle is located behind the driving vehicle and/or approaches the driving vehicle in a sideways direction from the rear of the driving vehicle.

Meanwhile, when calculating the distance between the preceding vehicle and the driving vehicle according to the relative location of (with respect to the driving vehicle) or direction of approach of the approaching/dangerous vehicle, the SCC control value calculation unit 150 increases the distance between the preceding vehicle and the driving vehicle if the dangerous vehicle approaches in the sideways direction from the front of the driving vehicle and decreases the distance between the preceding vehicle and the driving vehicle if the dangerous vehicle approaches in the sideways direction from the rear of the driving vehicle.

The SCC control value calculation unit 150 outputs the control area calculation result for the SCC system 40 to the drive control unit 160.

The drive control unit 160 outputs a control signal to at least one of the LKAS 30 and the SCC system 40 according to the calculation result(s) received from one or both of the LKAS control area calculation unit 140 and the SCC control value calculation unit 150.

Here, the drive control unit 160 may output a control signal according to the degree of danger presented by the approaching/dangerous vehicle. For instance, the drive control unit 160 may output the control signal to the LKAS 30 based on the control area calculated for the LKAS 30 in situations in which the degree of danger presented by the approaching/ dangerous vehicle is equal to or less than reference threshold value. Meanwhile, the drive control unit 160 may output the control signal to both the LKAS 30 and the SCC system 40 based on the control area calculated for the LKAS 30 and the control value calculated for the SCC system 40 in the case in which the degree of danger presented by the approaching/ dangerous vehicle exceeds the reference threshold value.

FIGS. 3A through 8 are illustrative diagrams showing the operation of an apparatus for providing crash prevention control functionality to a vehicle according to the exemplary embodiment of the present disclosure.

Figure 3A:
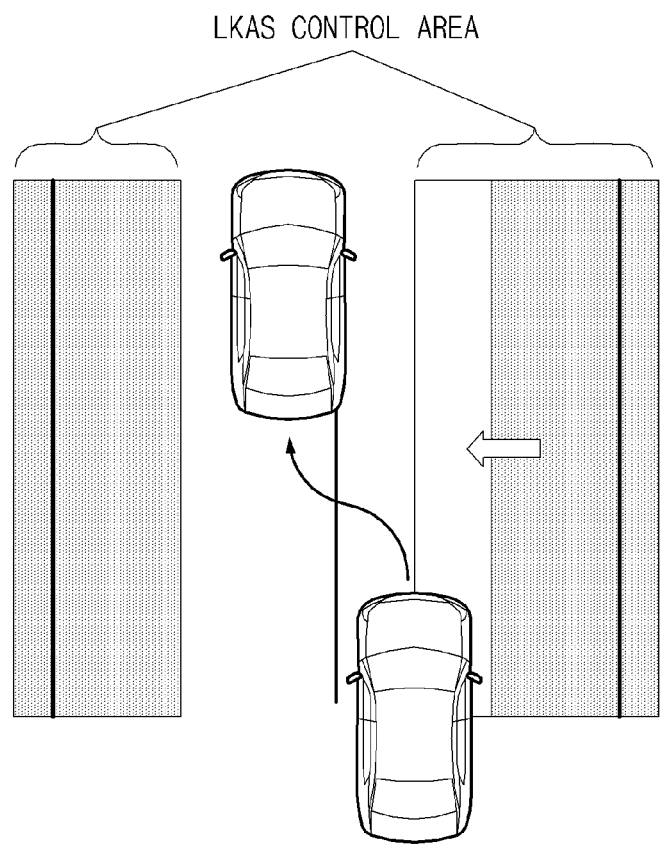
FIGS. 3A, 3B, 4A, 4B, 4C, 5, 6, 7A, 7B, 8, and 9 show diagrams illustrating an operation of an apparatus for providing a crash prevention control functionality to a vehicle according to the exemplary embodiment of the present disclosure.
Figure 3B:
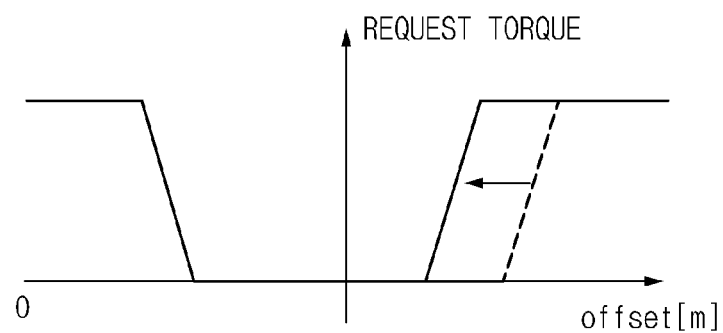

FIGS. 3A and 3B are diagrams illustrating an operation for expanding the control area of the LKAS. The control area of the LKAS, corresponding to an area away from which the driving vehicle should remain (e.g., an area of adjacent lanes), is shown in a shaded coloring. Referring to FIGS. 3A and 3B, the control apparatus according to the exemplary embodiment of the present disclosure expands a preset LKAS control area in the case in which the dangerous vehicle approaches the driving vehicle in a sideways direction. As shown in FIGS. 3A and 3B, the control apparatus expands the control area in the direction in which the dangerous vehicle approaches (as indicated by the white arrow), and maintains the existing set value in the control area in the opposite direction in which the dangerous vehicle does not approach. In the example of FIG. 3A, the control area to the right of the driving vehicle is expanded in response to a dangerous vehicle approaching the right side of the driving vehicle, and the control area is expanded in a leftward direction since the approaching vehicle is moving leftwards towards the driving vehicle.

Therefore, the controlled vehicle may avoid the dangerous vehicle approaching from the side direction without deviating from the lane.

Figure 4A:
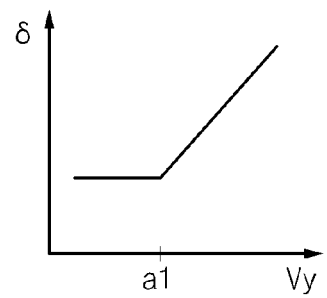
Figure 4B:
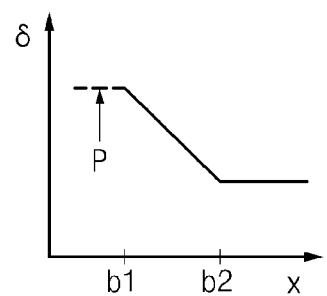
Figure 4C:
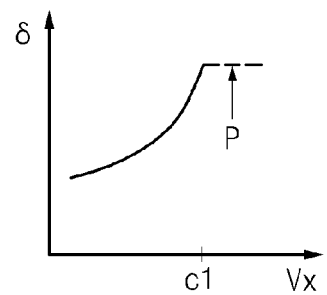

FIGS. 4A-4C show graphs used as part of an operation to determine an extension value of a control area, such as when expanding the LKAS control area as shown in FIG. 3.

Referring to FIGS. 4A-4C, the control apparatus considers the longitudinal velocity of the driving vehicle Vy, the transverse distance x between the vehicles, and the relative velocity Vx of the vehicles in a transverse direction in order to determine the expansion value of the LKAS control area.

Here, when calculating the expansion value for the LKAS control area in the control apparatus, the expansion amount $\delta$ of the LKAS control area is determined according to the speed Vy of the driving vehicle based on the graph shown in FIG. 4A. That is, when the speed Vy of the driving vehicle exceeds the reference value $a_1$, the expansion amount $\delta$ of the LKAS control area increases in proportion to the speed Vy of the driving vehicle.

In addition, when calculating the expansion value for the LKAS control area in the control apparatus, the expansion amount $\delta$ of the LKAS control area is determined according to the relative distance x between the vehicles in the transverse direction based on the graph shown in FIG. 4B. That is, when the relative distance x between the vehicles is equal to or less than a minimum reference value $b_1$, the control apparatus controls an acceleration or a deceleration of the driving vehicle with the SCC control value. When the relative distance x between the vehicles exceeds a maximum reference value $b_2$, the expansion amount $\delta$ of the LKAS control area maintains a given value. Meanwhile, when the relative distance x between the vehicles exceeds the minimum reference value $b_1$ and is below the maximum reference value $b_2$, the expansion amount $\delta$ of the LKAS control area decreases in inverse proportion to the relative distance x between the vehicles.

In addition, when calculating the expansion value for the LKAS control area in the control apparatus, the expansion amount $\delta$ of the LKAS control area is determined according to the relative velocity Vx of the vehicles in a transverse direction based on the graph shown in FIG. 4C. That is, the expansion amount $\delta$ of the LKAS control area increases in proportion to the relative velocity Vx of the vehicles when the relative velocity Vx is equal to or less than a reference value $c_1$. Meanwhile, when the relative velocity Vx exceeds the reference value $c_1$, the control apparatus controls the acceleration or the deceleration of the driving vehicle with the SCC control value.

Figure 5:
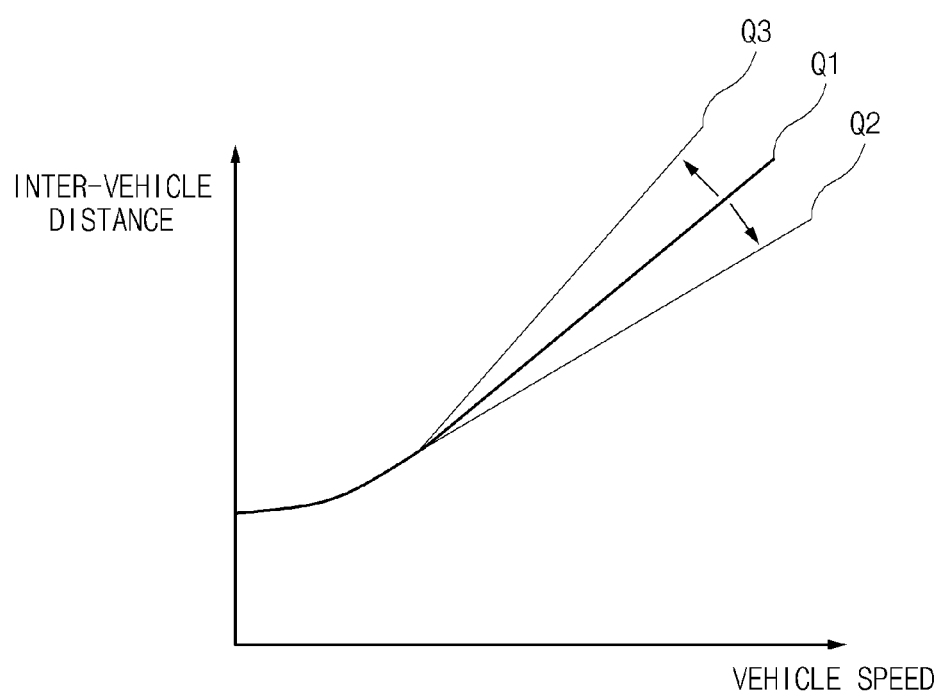

FIG. 5 shows a graph illustrating a relationship between an inter-vehicle distance between a preceding vehicle and the driving vehicle as a function of the vehicle speed of the driving vehicle. Such a relationship may be used in the control of the SCC system. The SCC system applied to the present disclosure generally performs the SCC control according to as the trace Q1 shown in FIG. 5.

In addition, the control apparatus of the present disclosure increases the inter-vehicle distance between the preceding vehicle and the driving vehicle, as shown in trace Q3 of FIG. 5, when a dangerous vehicle approaches the driving vehicle from a side direction of the front of the driving vehicle during the SCC control. Accordingly, the SCC system performs the SCC control according to the graph trace Q3 to cause the driving vehicle to decelerate, thereby making it possible to avoid the dangerous vehicle approaching from the side direction of the front of the driving vehicle by reducing the speed of the driving vehicle.

In addition, the control of the present disclosure decreases the inter-vehicle distance between the preceding vehicle and the driving vehicle, as shown in trace Q2 of FIG. 5, when a dangerous vehicle approaches the driving vehicle from a side direction of the rear of the driving vehicle during the SCC control. Accordingly, the SCC system performs the SCC control according to the graph trace Q2 to cause the driving vehicle to accelerate, thereby making it possible to avoid the dangerous vehicle approaching from the side direction of the rear of the driving vehicle by increasing the speed of the driving vehicle.

When a preceding vehicle is not present in front of the driving vehicle (or no present within a predetermined distance from the front of the driving vehicle), the control apparatus of the present disclosure may control the speed of the driving vehicle based on the SCC set speed of the driving vehicle rather than based on the inter-vehicle distance between the preceding vehicle and the driving vehicle as shown in FIG. 5.

Figure 6:
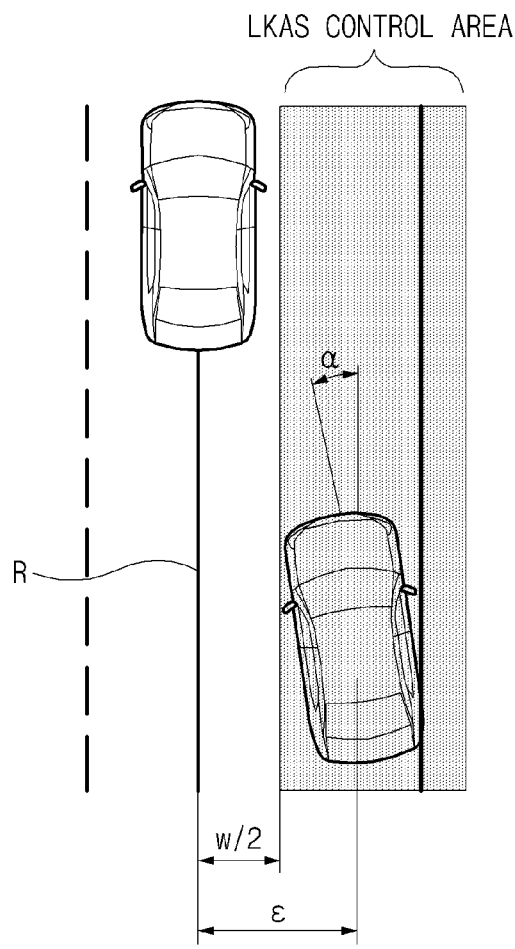

FIG. 6 is a diagram illustrating a LKAS steering control operation. Referring to FIG. 6, the control apparatus of the present disclosure may generate a reference line R to be followed by the driving vehicle when the driving vehicle is in its line (outside of the LKAS control area shown as a shaded region in FIG. 6). In this case, the reference line R may be generated at a distance of at least ½ of a vehicle width w, i.e., w/2, from the edge of the control area.

The LKAS may perform a proportional-integral-derivative (PID)-based feedback control based on the factors $\alpha$ and $\epsilon$, as shown in FIG. 6 to maintain the driving vehicle on or near the generated reference line R. The feedback control can further provide curvature information with a feed-forward control type when a road curvature (and resulting reference line R curvature) exists. In this case, when the vehicle deviates from the reference line R and into the LKAS control area, the LKAS stops the PID feedback control for $\epsilon$ but maintains the PID feedback control for a until the vehicle direction is stabilized.

In situations in which the control area is modified, the control apparatus of the present disclosure may also modify the reference line R for the driving vehicle in the modified control area. Therefore, the LKAS performs the PID feedback control for $\alpha$ and $\epsilon$ based on the modified reference line R in the modified control area.

FIGS. 7A, 7B, 8, and 9 are diagrams illustrating examples of vehicle avoidance under the LKAS and the SCC system according to the LKAS control area and the SCC control value calculated by the control apparatus of the present disclosure.

Figure 7A:
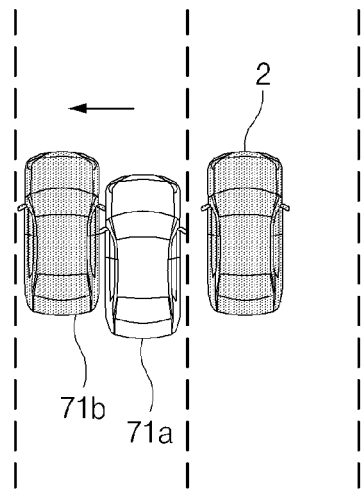
Figure 7B:
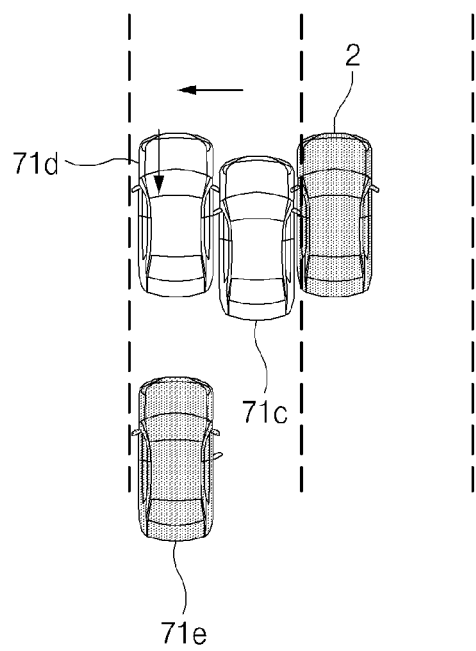

Referring to FIGS. 7A and 7B, FIG. 7A illustrates the functioning of the vehicle avoidance apparatus in situations in which a dangerous vehicle having a low degree of approaching danger approaches the driving vehicle in a sideways direction, and FIG. 7B illustrates vehicle avoidance in situations in which a dangerous vehicle having a high degree of approaching danger approaches the driving vehicle in a sideways direction.

As shown in FIG. 7A, in the case in which the dangerous vehicle (2) having a low degree of approaching danger approaches the driving vehicle, the control apparatus calculates the modified LKAS control area to provide the calculated/modified control area to the LKAS. Based on the calculated control area, the LKAS may avoid the dangerous vehicle by causing driving vehicle to move aside based on the calculated control area (from a position 71a to a position 71b). Meanwhile, as shown in FIG. 7B, in the case in which the dangerous vehicle (2) having a high degree of approaching danger approaches the driving vehicle, the control apparatus calculates the modified LKAS control area and the SCC control value to provide the calculated/modified control area and the control value to the LKAS and the SCC system, respectively. Based on the calculated/modified control area, the LKAS causes the driving vehicle to move aside based on the calculated/modified control area (from a position 71c to a position 71d), and the SCC system decreases the SCC set speed to increase the inter-vehicle distance between the preceding vehicle and the driving vehicle based on the calculated control value (causing the driving vehicle to move from position 71d to position 71e), thereby making it possible to avoid the dangerous vehicle.

Figure 8:
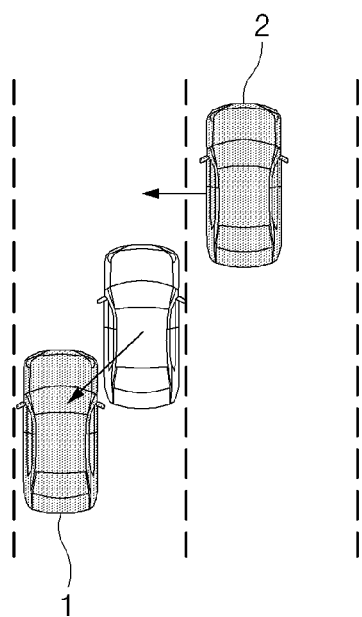

FIG. 8 illustrates the functioning of the vehicle avoidance apparatus in a situation in which the dangerous vehicle approaches the driving vehicle from a side direction of the front of the driving vehicle. As shown in FIG. 8, in the case in which the dangerous vehicle (2) approaches from the side direction of the front of the driving vehicle (1), the control apparatus expands the LKAS control area, decreases the SCC set speed, and increases the inter-vehicle distance between the preceding vehicle and the driving vehicle based on control from the LKAS and SCC system, respectively.

Accordingly, the LKAS moves the driving vehicle aside based on the calculated control area, and the SCC system decreases the SCC set speed or increases the inter-vehicle distance between the preceding vehicle and the driving vehicle based on the calculated control value, so that the dangerous vehicle can be avoided.

Figure 9:
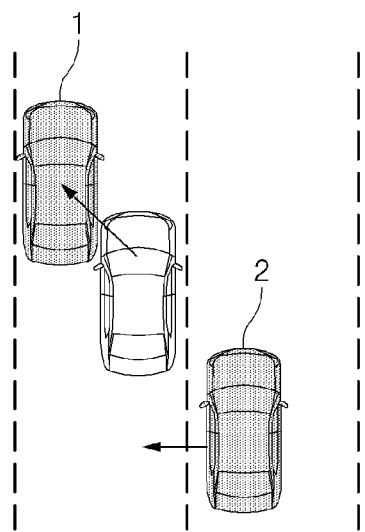

Meanwhile, FIG. 9 illustrates the functioning of the vehicle avoidance apparatus in a situation in which the dangerous vehicle approaches from the side direction of the rear of the driving vehicle. As shown in FIG. 9, in the case in which the dangerous vehicle (2) approaches from the side direction of the rear of the driving vehicle (1), the control apparatus expands the LKAS control area, increases the SCC set speed, and decreases the inter-vehicle distance between the preceding vehicle and the driving vehicle based on control from the LKAS and the SCC system, respectively.

Accordingly, the LKAS moves the driving vehicle aside based on the calculated control area, and the SCC system increases the SCC set speed or decreases the inter-vehicle distance between the preceding vehicle and the driving vehicle based on the calculated control value, so that the dangerous vehicle can be avoided.

An operation flow of the apparatus for controlling the crash prevention of the vehicle according to the exemplary embodiment of the present disclosure as described above will be described in detail.

Figure 10:
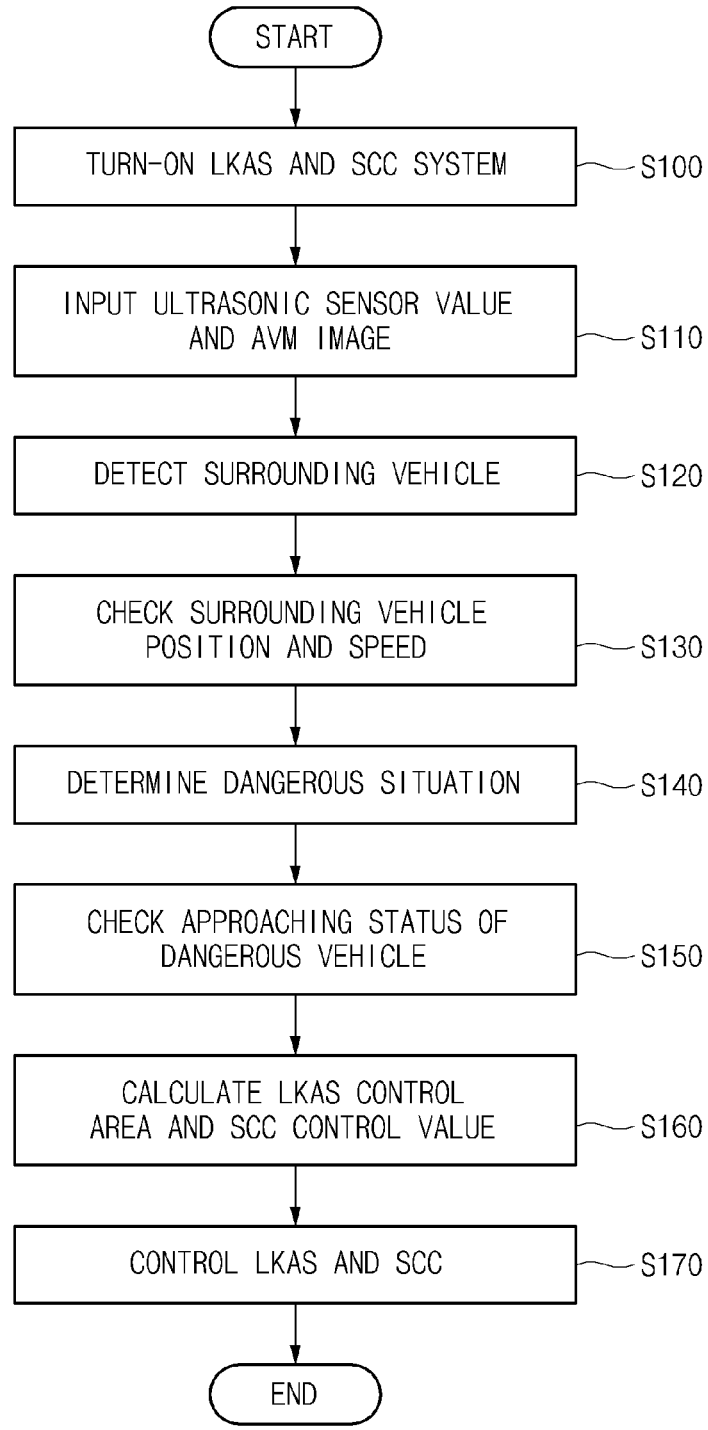
FIG. 10 is a flowchart illustrating an operation flow of a process for providing a crash prevention control functionality to a vehicle according to the exemplary embodiment of the present disclosure.

FIG. 10 is a flowchart illustrating an operation flow of a method for providing a crash prevention control functionality to a vehicle according to the exemplary embodiment of the present disclosure. Referring to FIG. 10, in a situation in which the LKAS and the SCC system are turned on (S100), the control apparatus receives a sensor value from the ultrasonic sensor and an AVM image from the AVM system (S110). In this case, the control apparatus detects a surrounding vehicle based on the sensor value and the AVM image input received in step S110 (S120) and checks or determines the position and the speed of the detected/surrounding vehicle (S130).

The control apparatus determines whether a dangerous situation is present due to the surrounding vehicle approaching in the side direction based on the position and the speed of the surrounding vehicle determined in step S130 (S140). As a result of step S140, when it is determined that the surrounding vehicle approaching in the side direction is a dangerous vehicle, the control apparatus checks or determines the approach state of the dangerous vehicle, such that the degree of approaching danger can be determined (S150).

In addition, the control apparatus calculates the LKAS control area and the SCC control value based on the result of step S140 and step S150 (S160), and provides the calculated result of step S160 to the LKAS and the SCC system to perform the LKAS and the SCC control (S170).

Here, a detailed description of the operations used to calculate the LKAS control area and the SCC control value and, thus, to perform the LKAS and the SCC control can be found above in relation to the descriptions of FIGS. 3A through 9.

According to the exemplary embodiment of the present disclosure, the apparatus and the method for providing a crash prevention control functionality to the vehicle use both of the LKAS and the SCC system in order to prevent the crash with the side approaching vehicle. The control of the vehicle's position in a transverse direction and the control of the vehicle's velocity in a longitudinal direction are simultaneously performed, thereby making it possible to avoid a crash with the side approaching vehicle.

In addition, when using the crash avoidance and prevention driving functionality, the driving vehicle is maintained in its lane, thereby further reducing the chances of a crash with a vehicle driving in another lane, thereby further increasing the safety and effectiveness of the crash avoidance and prevention functionality.

Although exemplary embodiments of the present disclosure have been described in detail hereinabove, it should be clearly understood that many variations and modifications of the basic inventive concepts taught herein fall within the spirit and scope of the present disclosure.

What is claimed is:

1. An apparatus for providing crash prevention control functionality to a vehicle, the apparatus comprising: a dangerous situation determining unit configured to determine whether a dangerous situation is developing with respect to a side approaching vehicle based on information relating to the side approaching vehicle approaching the vehicle from a side direction;
   a lane keeping assist system (LKAS) control area calculation unit configured to calculate a control area to apply to an LKAS to cause the vehicle to move in a direction transverse to a direction of travel of the vehicle while remaining in a current lane of the vehicle to avoid the side approaching vehicle when it is determined that the side approaching vehicle is causing a dangerous situation according to the determination result;
   a smart cruise control (SCC) control value calculation unit configured to calculate a control value to apply to an SCC system to avoid the side approaching vehicle when it is determined that the side approaching vehicle is causing a dangerous situation according to the determination result;

and a drive control unit configured to determine at least one of the LKAS and the SCC system to which a control signal should be output based on the result of determining whether the side approaching vehicle is causing a dangerous situation, and to selectively output the control signal to the determined at least one of the LKAS and the SCC system according to the result of determining whether the side approaching vehicle is causing a dangerous situation;

wherein the LKAS is configured to perform a proportional-integral-derivative CPID)-based feedback control to maintain the vehicle on or near a reference line R to be followed by the vehicle, wherein the PID-based feedback control is performed based on a steering angle α and a distance ε the center of the vehicle measured relative to the reference line R;

wherein the LKAS is further configured to perform a feed-forward control in response to determining a road curvature or a reference line R curvature, wherein the feed-forward control includes maintaining PID feedback control based on the steering angle α while suspending the PID feedback control based on the distance ε to the center of the vehicle until the vehicle direction is stabilized.

2. The apparatus of claim 1, wherein the LKAS control area calculation unit and the SCC control value calculation unit respectively calculate the control area and the control value based on at least one of: a velocity of the vehicle in a longitudinal direction, a distance between the vehicle and the side approaching vehicle, and a relative velocity of the vehicles.

3. The apparatus of claim 1, wherein the LKAS control area calculation unit expands the control area for the vehicle in a range that does not extend beyond boundaries of a current lane of the vehicle.

4. The apparatus of claim 3, wherein the LKAS control area calculation unit calculates an expansion value to expand the control area in a direction in which the side approaching vehicle approaches the vehicle.

5. The apparatus of claim 1, wherein the SCC control value calculation unit increases or decreases a SCC set speed for the vehicle according to the relative location of the approaching vehicle.

6. The apparatus of claim 5, wherein the SCC control value calculation unit decreases the SCC set speed when the approaching vehicle approaches in a sideways direction from a front of the vehicle, and increases the SCC set speed when the dangerous vehicle approaches in a sideways direction from a rear of the vehicle.

7. The apparatus of claim 1, wherein the SCC control value calculation unit increases or decreases a distance between the vehicle and a preceding vehicle according to the relative location of the approaching vehicle.

8. The apparatus of claim 7, wherein the SCC control value calculation unit increases the distance between the vehicle and the preceding vehicle when the approaching vehicle approaches in a sideways direction from the front and decreases the distance between the vehicle and the preceding vehicle when the approaching vehicle approaches in a sideways direction from the rear.

9. The apparatus of claim 1, wherein the drive control unit outputs the control signal to only the LKAS in situations in which the side approaching vehicle is determined to cause a dangerous situation to cause the vehicle to move in a direction transverse to a direction of travel of the vehicle to avoid the side approaching vehicle.

10. The apparatus of claim 1, wherein the drive control unit outputs the control signal to both the LKAS and the SCC system when the side approaching vehicle is determined to cause a dangerous situation to cause the vehicle to move in a direction transverse to a direction of travel of the vehicle to avoid the side approaching vehicle and to cause the vehicle to accelerate or decelerate to avoid the side approaching vehicle.

11. A method for providing crash prevention control functionality to a vehicle, the method comprising:

determining whether a dangerous situation is developing with respect to a side approaching vehicle based on information relating to the side approaching vehicle approaching the vehicle from a side direction;

calculating a control area to apply to a lane keeping assist system (LKAS) to cause the vehicle to move in a direction transverse to a direction of travel of the vehicle while remaining in a current lane of the vehicle, and a control value to apply to a smart cruise control (SCC) system, to avoid the side approaching vehicle when it is determined that the side approaching vehicle is causing a dangerous situation according to the determination result;

determining at least one of the LKAS and the SCC system to which a control signal should be output based on the result of determining whether the side approaching vehicle is causing a dangerous situation;

and selectively outputting the control signal to the determined at least one of the LKAS and the SCC system according to the result of determining whether the side approaching vehicle is causing a dangerous situation;

and performing a proportional-integral-derivative (PID)-based feedback control in the LKAS to maintain the vehicle on or near a reference line R to be followed by the vehicle, wherein the PID based feedback control is performed based on a steering angle α and a distance ε to the center of the vehicle measured relative to the reference line R;

and performing a feed-forward control in the LKAS in response to determining a road curvature or a reference line R curvature, wherein the performing of the feed-forward control includes maintaining PID feedback control based on the steering angle ε while suspending the PID feedback control based on the distance ε to the center of the vehicle until the vehicle direction is stabilized.

12. The method of claim 11, wherein calculating the control area and the control value comprises calculating the control area and the control value based on at least one of: a velocity of the vehicle in a longitudinal direction, a distance between the vehicle and the side approaching vehicle, and a relative velocity of the vehicles.

13. The method of claim 11, wherein calculating the control area comprises expanding the control area of the LKAS in a range that does not extend beyond boundaries of a current lane of the vehicle.

14. The method of claim 13, wherein calculating the control area comprises calculating an expansion value to expand the control area in a direction in which the side approaching vehicle approaches the vehicle.

15. The method of claim 11, wherein calculating the control area comprises increasing or decreasing the SCC set speed for the vehicle according to the relative location of the approaching vehicle.

16. The method of claim 11, wherein calculating the control area comprises increasing or decreasing a distance between a preceding vehicle and the vehicle according to the relative location of the approaching vehicle.

17. The method of claim 11, wherein outputting the control signal comprises outputting the control signal to both the LKAS and the SCC system when the side approaching vehicle is determined to cause a dangerous situation to cause the vehicle to move in a direction transverse to a direction of travel of the vehicle to avoid the side approaching vehicle and to cause the vehicle to accelerate or decelerate to avoid the side approaching vehicle.

18. The apparatus of claim 1, wherein the LKAS control area calculation unit calculates the control area based on a distance between the vehicle and the side approaching vehicle, and a relative velocity of the vehicles.

19. The method of claim 11, wherein calculating the control area to apply to the LKAS comprises calculating the control area based on a distance between the vehicle and the side approaching vehicle, and a relative velocity of the vehicles.

* * * * *